(12) United States Patent
Goettert et al.

(10) Patent No.: US 9,209,715 B2
(45) Date of Patent: Dec. 8, 2015

(54) THERMOELECTRIC CONVERTER AND SYSTEM COMPRISING A THERMOELECTRIC CONVERTER

(75) Inventors: Carsten Goettert, Hochheim (DE);
Harald Huels, Horb (DE);
Hans-Guenter Kraemer, Wittlich (DE);
Manfred Ries, Mainz (DE); Rolf Schaefer, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 938 days.

(21) Appl. No.: 13/291,200

(22) Filed: Nov. 8, 2011

(65) Prior Publication Data

US 2012/0113594 A1 May 10, 2012

(30) Foreign Application Priority Data

Nov. 9, 2010 (EP) ..................................... 10190502

(51) Int. Cl.
*H02N 10/00* (2006.01)
*H02N 3/00* (2006.01)

(52) U.S. Cl.
CPC . *H02N 10/00* (2013.01); *H02N 3/00* (2013.01)

(58) Field of Classification Search
CPC .................................. H02N 3/00; H02N 10/00
USPC ................................................. 310/306, 307
IPC ....................................................... H02K 3/00
See application file for complete search history.

(56) References Cited

U.S. PATENT DOCUMENTS

| | | | | |
|---|---|---|---|---|
| 4,748,495 A | * | 5/1988 | Kucharek | 257/713 |
| 7,104,056 B2 | * | 9/2006 | Taya et al. | 60/527 |
| 7,235,912 B2 | * | 6/2007 | Sung | 310/306 |
| 2005/0062360 A1 | * | 3/2005 | Yabuta | 310/306 |
| 2008/0122398 A1 | * | 5/2008 | Ho | 320/101 |
| 2009/0315335 A1 | * | 12/2009 | Ujihara et al. | 290/1 R |

FOREIGN PATENT DOCUMENTS

RU  22379820 C1  12/2008
RU  2382479 C1 * 2/2010

OTHER PUBLICATIONS

Translation of RU2382479C1 Sep. 2014.*
"Homogeneous." Dictionary.com Unabridged. Random House, Inc. Feb. 6, 2015. <Dictionary.com http://dictionary.reference.com/browse/homogeneous>.*
Google Machine Translation, Krukovskij et al., RU 2382479, Feb. 6, 2015.*

* cited by examiner

*Primary Examiner* — Thomas Truong
(74) *Attorney, Agent, or Firm* — Patterson & Sheridan, LLP (57) ABSTRACT

An apparatus and process are disclosed that relates to a thermoelectric converter for converting thermal energy into electric energy. The apparatus includes at least one magnetic circuit including magnetic flux; at least one electric coil coupled to the at least one magnetic circuit; a magnetic switch coupled to the at least one magnetic circuit which loads the at least one electric coil with magnetic flux of the at least one magnetic circuit depending on a temperature of the magnetic switch, wherein the magnetic switch has a ferromagnetic state below a critical temperature (Tc) and a paramagnetic state above the critical temperature (Tc).

14 Claims, 5 Drawing Sheets

THERMOELECTRIC CONVERTER AND SYSTEM COMPRISING A THERMOELECTRIC CONVERTER

FIELD OF THE INVENTION

The invention relates to a thermoelectric converter and a system comprising a thermoelectric converter.

BACKGROUND OF THE INVENTION

Water-cooled server farms produce waste heat in the range of MW as hot water at a substantially constant temperature level of about 80° C. The hot water can be used for heating purposes or as service water for industrial or domestic use. However, while a demand for hot water generally fluctuates strongly during the day, the supply of hot water from a server farm remains constant, making such a use of waste heat inefficient.

Converting the thermal energy of the waste heat in mechanical energy, e.g. by driving a steam turbine, requires high temperatures of several hundred degrees Celsius.

It is well known in the art to use waste heat for generation of electric energy. For instance, RU 2 379 820 C1 describes a thermoelectric converter employing a permalloy composition having a Curie temperature Tc of e.g. 70° C. Above the Curie temperature, permalloy is paramagnetic, below the Curie temperature, permalloy is ferromagnetic. In a closed magnetic circuit an excitation coil is arranged which is supplied by a DC source. Inside the coil permalloy is arranged for altering the magnetic flux in the coil by heating and cooling the permalloy above and above the Curie temperature.

SUMMARY OF THE INVENTION

It is an object of the invention to provide a thermoelectric converter with an improved efficiency.

It is another object of the invention to provide a cooling system comprising a thermoelectric converter with an improved efficiency.

These objects are achieved by the features of the independent claims. The other claims and the specification disclose advantageous embodiments of the invention.

A thermoelectric converter is proposed for converting thermal energy into electric energy, comprising
at least one magnetic circuit including magnetic flux;
at least one electric coil coupled to the at least one magnetic circuit; and
a magnetic switch coupled to the at least one magnetic circuit which loads the at least one electric coil with magnetic flux of the at least one magnetic circuit depending on a temperature of the magnetic switch, wherein the magnetic switch has a ferromagnetic state below a critical temperature and a paramagnetic state above the critical temperature.

Advantageously, the thermoelectric converter can be scaled for semiconductor devices as well as for computer or even server farms. The material of the magnetic switch can be selected to fit to the available temperatures, for instance permalloy below 100° C. or other materials for higher temperatures. The magnetic switch can be driven by heating and cooling the magnetic switch even without mechanical elements. Temperature oscillations result in an oscillating magnetic field in the at least one electric coil so that depending on the magnetic state of the magnetic switch a magnetic voltage is induced in the electric coil arranged in magnetic circuit or not. In case two magnetic circuits are provided each with an electric coil, magnetic flux can be switched between the magnetic circuit by ways of the magnetic switch and electric voltage induced alternately in one coil or the other.

In the ferromagnetic state of the magnetic switch, the magnetic resistance of the magnetic switch is low and the magnetic switch can guide the magnetic flux to the coil, while in the paramagnetic state the magnetic flux is blocked because the magnetic resistance of the magnetic switch becomes very high. The magnetic flux may expediently result from a permanent magnet of reasonable field strength, such as a rare earth or rare earth alloy magnet. By the magnetic switching activity of the magnetic switch when passing the Curie temperature, i.e. by switching from the paramagnetic state and the ferromagnetic state, the at least one electric coil receives a fluctuating magnetic flux which induces an electric voltage in the electric coil, thus generating electric energy.

Because of the small volume and the small mass of the magnetic switch, the converter can be integrated into a chip cooling unit, particularly for water cooling. It can be manufactured by standard methods as used in the semiconductor industry.

According to an advantageous embodiment of the invention, the at least one magnetic circuit may comprise at least one ferromagnetic bridge. The ferromagnetic bridge expediently connects the electric coil and the magnet and guides magnetic flux to the electric coil. The ferromagnetic bridge closes the magnetic circuit when the magnetic switch is in the ferromagnetic state.

According to an advantageous embodiment of the invention, the at least one electric coil may be coupled to the at least one ferromagnetic bridge, thus providing a high efficiency in coupling the magnetic flux into the electric coil.

According to an advantageous embodiment of the invention, at least two ferromagnetic bridges may be provided in the at least one magnetic circuit, and wherein an electric coil is coupled to each ferromagnetic bridge. Expediently, the ferromagnetic bridges are parallel to each other. Particularly, the magnetic switch may be coupled to one of the at least two ferromagnetic bridges. When the magnetic switch is in the ferromagnetic state, the respective bridge forms a magnetic short because the magnetic resistance of this bridge is very low compared to the magnetic resistance of the other bridge, thus preventing magnetic flux to enter the other ferromagnetic bridge. Expediently, means are provided in the other ferromagnetic bridge to adjust the magnetic flux in this ferromagnetic bridge, e.g. a small gap. When the magnetic switch is in its paramagnetic state, the respective ferromagnetic bridge has a high magnetic resistance while the other ferromagnetic bridge has a lower magnetic resistance so that magnetic flux can enter in this ferromagnetic bridge.

The magnetic state of the magnetic switch causes the ferromagnetic bridges to carry magnetic flux so that changing the magnetic state of the magnetic switch can alternately guide magnetic flux in one or the other electric coil associated with the respective ferromagnetic bridge. Optionally, more than two ferromagnetic bridges can be provided. It is possible to have a switch in each or one or only some of the ferromagnetic bridges.

According to an advantageous embodiment of the invention, the magnetic switch may be designed to have a moving part moving between a first interface and a second interface depending on a temperature of the magnetic switch. For instance, the first interface can be at a higher temperature than the second interface. By contacting the first interface, the magnetic switch can be heated above the Curie temperature and by contacting the second interface the magnetic switch can be cooled below the Curie temperature. It is of advantage that the magnetic switch, besides the magnetic effect when passing the Curie temperature, can transport heat from the first interface to the second interface. The larger the temperature difference between the two interfaces is, the more efficient is the cooling effect.

According to an advantageous embodiment of the invention, the magnetic switch may be arranged in an inhomogeneous magnetic field. Favorably, the inhomogeneity of the magnetic field can generate a driving force acting upon the magnetic switch which can move a moving part of the magnetic switch from one interface to the other when the magnetic switch is in its ferromagnetic state.

According to an advantageous embodiment of the invention, the magnetic switch may be coupled to a return means such as a spring. The return means can generate a driving force which can move the magnetic switch in one direction from one interface to the other when the magnetic switch is in its paramagnetic state. Advantageously, the driving forces of the return means and the inhomogeneous magnetic field act in opposing directions by acting on the magnetic switch in different magnetic states so that a directed movement of the magnetic switch is ensured which is generated either by the inhomogeneous magnetic field or by the return means, depending on the magnetic state of the magnetic switch.

According to an advantageous embodiment of the invention, the magnetic switch may have a first position, e.g. a spring-loaded position, if the moving part is in paramagnetic state—at one of the two interfaces and a second position, e.g. a magnetic field-loaded position, if the moving part is in ferromagnetic state at the other of the two interfaces. Advantageously, the magnetic field drives the magnetic switch in its ferromagnetic state to the hot interface when the magnetic switch is in its ferromagnetic state where the magnetic switch is subsequently heated up until it reaches the paramagnetic state and the return means, e.g. a spring, drives the magnetic switch to the cold interface when the magnetic switch is in its paramagnetic state where the magnetic switch subsequently is cooled down until it reaches the ferromagnetic state and is then driven back by the inhomogeneous magnetic field and so forth.

According to an advantageous embodiment of the invention, the magnetic switch may be arranged in a gap in the at least one ferromagnetic bridge. A compact arrangement can be achieved.

According to an advantageous embodiment of the invention, the magnetic switch may be fixedly arranged a ferromagnetic bridge in the magnetic circuit. Advantageously, the magnetic switching effect can be made with the only micro mechanical moving part inside the magnetic switch and with only very little noise generation.

Advantageously, a constriction and/or an air gap may be provided in one of the magnetic circuits without the magnetic switch. The constriction may be designed so that a magnetic saturation can be reached at a distinctly lower magnetic flux density than for the movable part of the magnetic switch in its ferromagnetic state. The air gap can preferably be designed to have a comparable effect as an air gap air gap in which the magnetic switch is arranged. The constriction and the air gap are optional and can improve the efficiency of the arrangement.

According to another aspect of the invention, a cooling system is proposed including a thermoelectric converter comprising at least one magnetic circuit including magnetic flux;
at least one electric coil coupled to the at least one magnetic circuit; and
a switch coupled to the at least one magnetic circuit which loads the at least one electric coil with magnetic flux of the at least one magnetic circuit depending on a temperature of the magnetic switch, wherein the magnetic switch has a ferromagnetic state below a critical temperature and a paramagnetic state above the critical temperature.

The cooling system is advantageously applicable for water-cooled devices with temperatures below 100° C. However, depending on the temperatures and materials, higher temperatures are possible.

According to an advantageous embodiment of the invention, the magnetic switch may be designed to be coupled at least temporarily to a heat sink of a cooling device for transporting waste heat. Removal of waste heat can expediently coupled with the generation of electric energy.

According to another aspect of the invention, a microelectronic device is proposed including a thermoelectric converter for converting waste heat into electric energy comprising
at least one magnetic circuit including magnetic flux;
at least one electric coil coupled to the at least one magnetic circuit;
a switch coupled to the magnetic circuit which loads the at least one electric coil with magnetic flux of the at least one magnetic circuit depending on a temperature of the magnetic switch, wherein the magnetic switch has a ferromagnetic state below a critical temperature and a paramagnetic state above the critical temperature.

Advantageously, the microelectronic device can be on a chip-size level, e.g. a power component, particularly a water-cooled component, or scaled up to macroscopic dimensions for computers or multiple computers as such in server farms. Because of the small volume and the small mass of the magnetic switch, the converter can be integrated into a chip cooling unit, particularly for water cooling. It can be manufactured by standard methods as used in the semiconductor industry.

According to an advantageous embodiment of the invention, the magnetic switch may be designed to be coupled at least temporarily to a cooling device for removing waste heat.

According to another aspect of the invention, a microelectronic device is proposed According to an advantageous embodiment of the invention, the cooling device may be a water-cooled heat sink.

BRIEF DESCRIPTION OF THE DRAWINGS

The present invention together with the above-mentioned and other objects and advantages may best be understood from the following detailed description of the embodiments, but not restricted to the embodiments, wherein is shown in:

FIG. 5a perspective view of an example embodiment of a thermoelectric converter.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION OF EXAMPLE EMBODIMENTS

Figure 1:
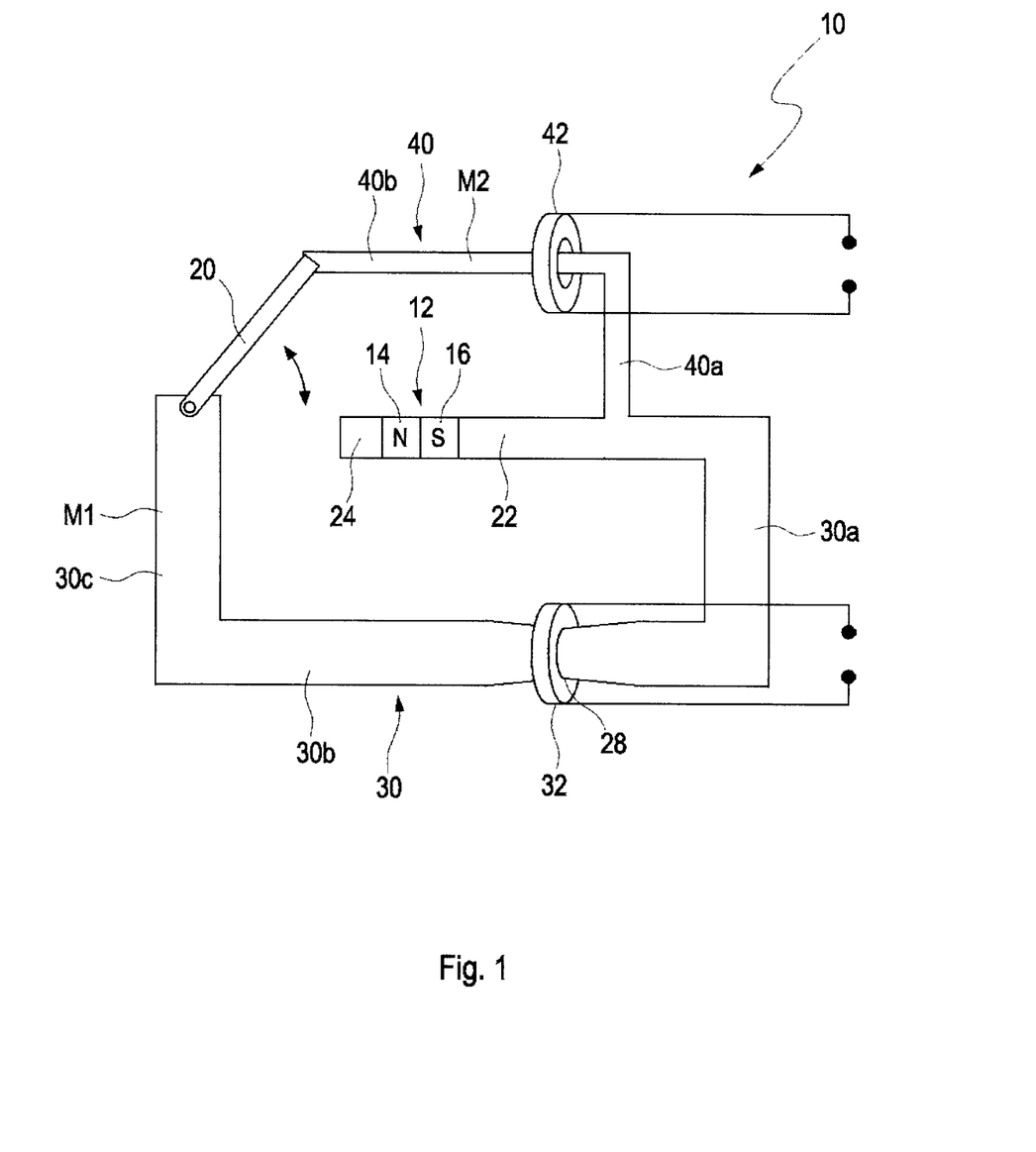
FIG. 1 a schematic sketch illustrating the working principle of a thermoelectric converter employing a magnetic switch.

FIG. 1 illustrates the working principle of a thermoelectric converter 10. The thermoelectric converter 10 converts thermal energy into electric energy.

The thermoelectric converter 10 comprises a magnet 12 with a first magnetic pole 14 (e.g. a north pole) and a second magnetic pole 16 (e.g. a south pole) and a magnetic switch 20 for closing either a first magnetic circuit M1 or a second magnetic circuit M2. The magnet 12 is arranged in a ferromagnetic leg 22 which is arranged parallel to a first ferromagnetic bridge 30 and a second ferromagnetic bridge 40.

The first ferromagnetic bridge 30 and the ferromagnetic leg 22 constitute the first magnetic circuit M1. The first ferromagnetic bridge 30 comprises ferromagnetic legs 30a, 30b and 30c wherein ferromagnetic legs 30a and 30c are contacting the ferromagnetic leg 22. A constriction 28 is arranged in the ferromagnetic leg 30b. The magnetic switch 20 is permanently in contact with the ferromagnetic leg 30c and can switch contact between the second ferromagnetic bridge 40 and a contact 24 at the ferromagnetic leg 22.

The second ferromagnetic bridge 40 and the ferromagnetic leg 22 constitute the first magnetic circuit M2. The second ferromagnetic bridge 40 comprises ferromagnetic legs 40a and 40b wherein ferromagnetic leg 40a is connected to the ferromagnetic leg 22 and the ferromagnetic leg 40b can be contacted by the magnetic switch 20 as shown in the Figure. The second ferromagnetic bridge 40 constitutes a short of the magnet 12 when the magnetic switch closes the second magnetic circuit M2 and has a predominantly smaller cross section than the first ferromagnetic bridge 30 so that the magnetic resistance of the second ferromagnetic bridge 40 is higher than that of the first ferromagnetic bridge 30.

The magnetic switch 20, at least when in a "closed state", can guide magnetic flux and can alternatively contact the ferromagnetic bridge 40 or the ferromagnetic leg 22, thus guiding magnetic flux to the respective magnetic circuit M1 or M2 being closed by the magnetic switch 30.

The magnetic switch 20 and the ferromagnetic bridges 30, 40 can be made of similar material, e.g. permalloy, although it is understood that a particular composition of permalloy used for ferromagnetic bridges 30, 40 must have a lower Curie temperature (Tc) than magnetic switch 20 such that magnetic bridges 30, 40 will always be ferromagnetic (i.e., not paramagnetic) for a temperature range in which the thermoelectric converter operates.

A suitable permalloy may be pure gadolinium which has a Curie temperature (Tc) of 20 C) or alloys such as $Gd_{0.84}Er_{0.16}$ and $Gd_{0.30}Ho_{20}$. One may find an overview about magnetic materials in, for example, "Handbook of Magnetic Materials", Volume 17, by K. H. J. Buschow (e.g., table 4.2 ff). A particular permalloy is selected such that the Tc of the particular permalloy is between a cold side and a hot side. For example, the cold side may be a heat sink and the hot side may be a semiconductor chip. In a particular case, a processor chip temperature may be 45 C; a Tc may be 40 C; and a heat sink may be water cooled to 35 C.

An electric coil 32 is arranged at the constriction 28 in the ferromagnetic bridge 30, e.g. wound around the constriction 28, and an electric coil 42 is arranged at the ferromagnetic bridge 40, e.g. wound around the ferromagnetic leg 40a. When the magnetic switch 20 switches between the magnetic circuits M1 and M2 the magnetic flux induced in the electric coils 32, 42 varies thus generating an electric voltage over the coils 32, 42, hence generating electric power.

Figure 2:
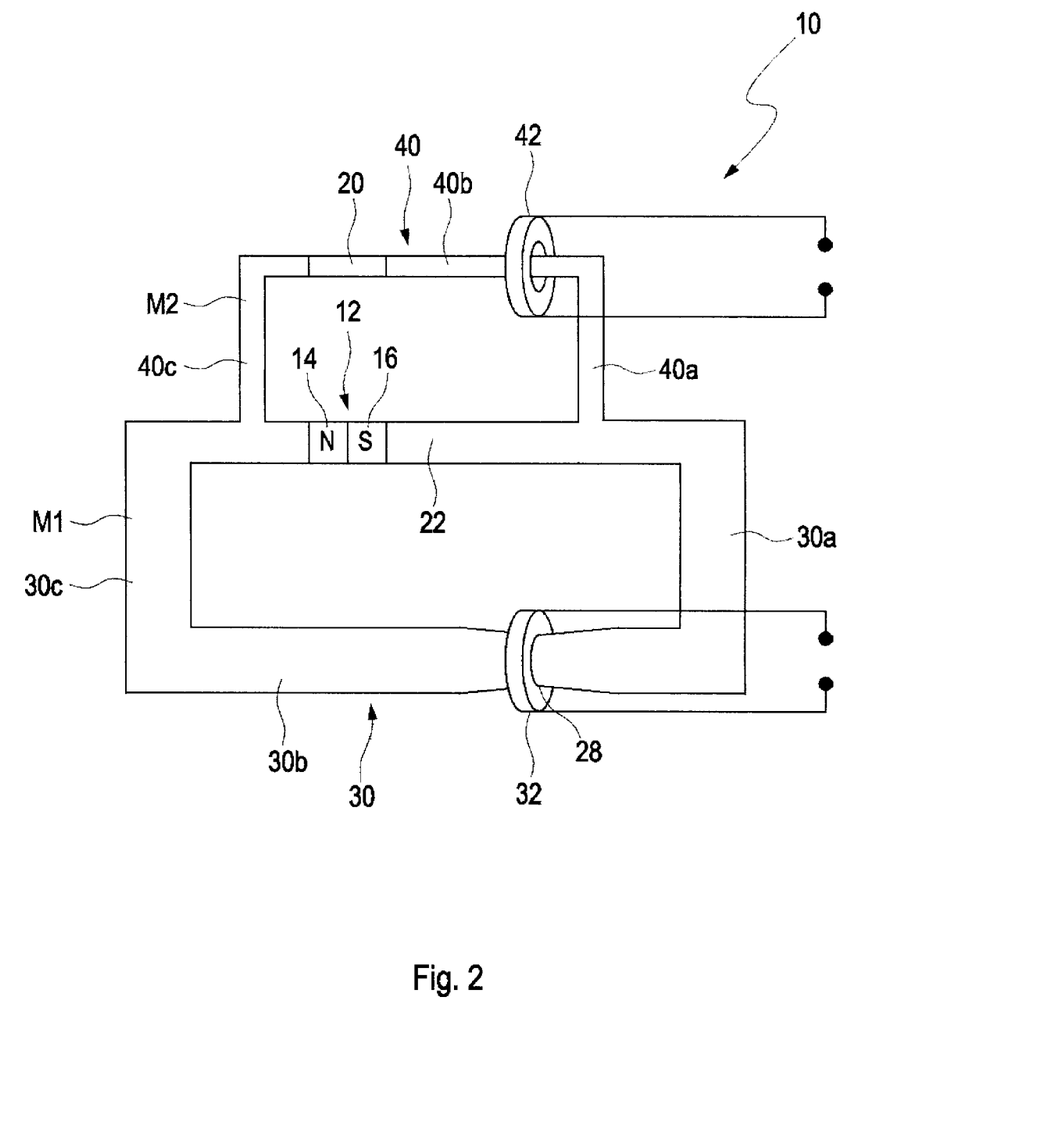
FIG. 2 an example embodiment of a thermoelectric converter comprising a fixed switch.

FIG. 2 depicts an example embodiment of a thermoelectric converter 10 according to the invention comprising a fixed switch 20 arranged in a ferromagnetic switch 30.

The thermoelectric converter 10 comprises a magnet 12 with a first magnetic pole 14 (e.g. a north pole) and a second magnetic pole 16 (e.g. a south pole) and a magnetic switch 20 for closing either a first magnetic circuit M1 or a second magnetic circuit M2. The magnetic switch 20 is arranged in the second magnetic circuit M2. The magnet 12 is arranged in a ferromagnetic leg 22 which is arranged parallel to a first ferromagnetic bridge 30 and a second ferromagnetic bridge 40.

The first ferromagnetic bridge 30 and the ferromagnetic leg 22 constitute the first magnetic circuit M1. The first ferromagnetic bridge 30 comprises ferromagnetic legs 30a, 30b and 30c wherein ferromagnetic legs 30a and 30c are contacting the ferromagnetic leg 22. A constriction 28 is arranged in the ferromagnetic leg 30b which provides a magnetic saturation at a lower magnetic flux density compared to the other regions of the magnetic circuit. The magnetic switch 20 is permanently in contact with the ferromagnetic leg 30c and can switch contact between the second ferromagnetic bridge 40 and a contact 24 at the ferromagnetic leg 22. Contact 24 is shown in FIG. 1.

The second ferromagnetic bridge 40 and the ferromagnetic leg 22 constitute the first magnetic circuit M2. The second ferromagnetic bridge 40 comprises ferromagnetic legs 40a, 40b and 40c, wherein ferromagnetic legs 40a and 40c are connected to the ferromagnetic leg 22. The second ferromagnetic bridge 40 constitutes a short of the magnet 12 when the magnetic switch 20 closes the second magnetic circuit M2 and has a predominantly smaller cross section than the first ferromagnetic bridge 30 so that the magnetic resistance of the second ferromagnetic bridge 40 is higher than that of the first ferromagnetic bridge 30.

The magnetic switch 20 is made of a material which has a magnetic transition at a critical temperature, called Curie temperature Tc, i.e. it has a ferromagnetic state below the critical temperature Tc and a paramagnetic state above the critical temperature Tc, so that by heating or cooling the magnetic switch 20 the magnetic state of the magnetic switch 20 can be switched between paramagnetism and ferromagnetism. The magnetic susceptibility of the magnetic switch 20 differs by several orders of magnitude between the paramagnetic and ferromagnetic states, so that in the ferromagnetic state magnetic flux can enter the magnetic switch 20 and in the paramagnetic state magnetic flux cannot enter the magnetic switch 20. In the ferromagnetic state, the magnetic switch 20 magnetically shorts the ferromagnetic leg 22 and guides magnetic flux into the second ferromagnetic bridge 40, thus closing the second magnetic circuit M2, while with the magnetic switch 20 in the paramagnetic state the first magnetic circuit M1 is closed by the ferromagnetic leg 22 with the magnet 12 and the ferromagnetic bridge 30.

An electric coil 32 is arranged at the constriction 28 in the ferromagnetic bridge 30, e.g. wound around the constriction 28, and an electric coil 42 is arranged at the ferromagnetic bridge 40, e.g. wound around the ferromagnetic leg 40a. When the magnetic switch 20 switches between the magnetic circuits M1 and M2 the magnetic flux induced in the electric coils 32, 42 varies thus generating an electric voltage over the coils 32, 42, hence generating electric power.

In the paramagnetic state the magnetic switch 20 disrupts the magnetic flux in the second magnetic circuit M2 and magnetic flux enters the first ferromagnetic bridge 30 allowing flux in the first magnetic circuit M1 and hence induces an electric voltage in the associated electric coil 32.

The magnetic switch 20 and the ferromagnetic bridges 30, 40 can be made of similar material, e.g. permalloy. As noted above, it is understood that the composition of the ferromagnetic bridges 30, 40 must be such that the Curie temperature Tc is low enough such that ferromagnetic bridges 30, 40 are ferromagnetic, not paramagnetic, during operation of the thermoelectric converter.

The constriction 28 is arranged for adjusting the magnetic flux in the first magnetic bridge 30 when the magnetic switch 20 is in its paramagnetic state. Because the constriction 28 in the first ferromagnetic bridge 30 is much smaller than the ferromagnetic legs 30a, 30b, 30c in the first ferromagnetic bridge 30, in the ferromagnetic state of the magnetic switch 20 hardly any magnetic flux enters the first ferromagnetic bridge 30.

By periodically heating and cooling the magnetic switch 20, more precisely a moving part of the magnetic switch 20, magnetic flux can be switched between the first and second ferromagnetic bridges 30, 40 and the coils 32, 42 are excited in an alternating mode.

Figure 3:
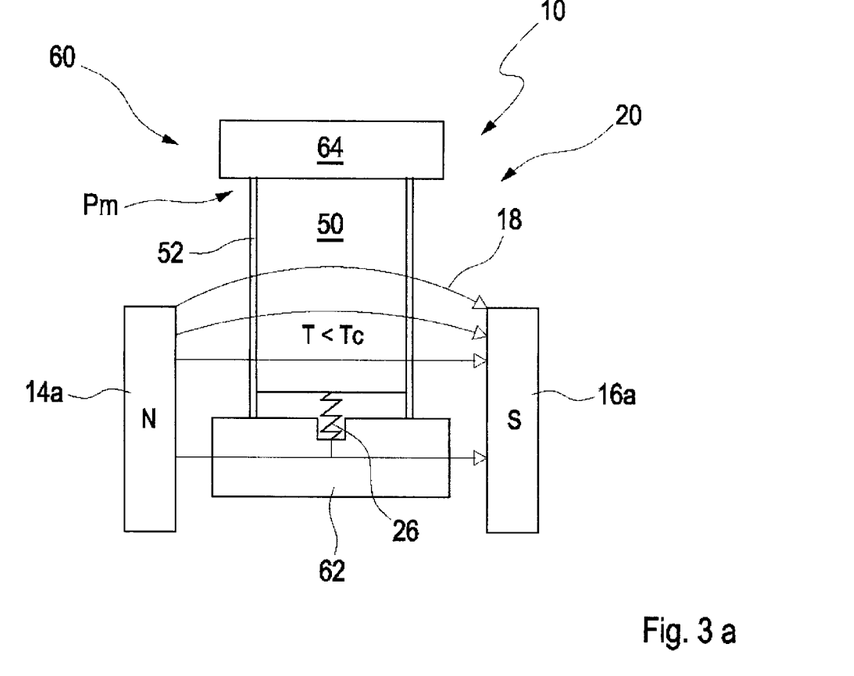
FIG. 3a, 3b a detail of a thermoelectric converter according to another example embodiment of the invention in a first switch state (FIG. 3a) and a second switch state (FIG. 3b)
Figure 4:
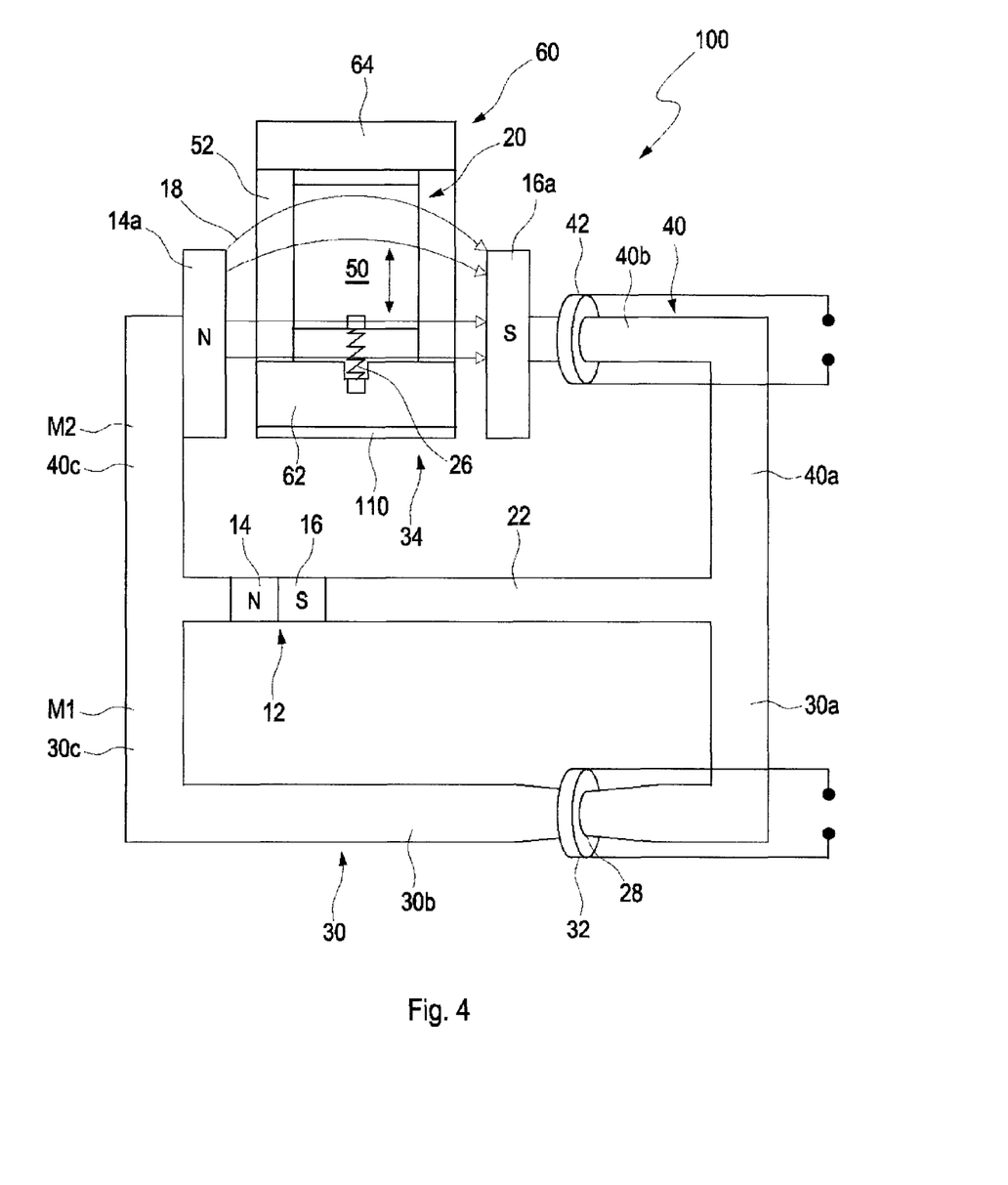
FIG. 4 an example embodiment of a thermoelectric converter comprising the magnetic switch portion of FIG. 3a, 3b.

FIGS. 3a, 3b depict a moving part 50 of the magnetic switch 20 as a detail of a thermoelectric converter 10 according to another example embodiment of the invention in a first switch state (FIG. 3a) and a second switch state (FIG. 3b) and FIG. 4 depicts an example embodiment of the thermoelectric converter 10 comprising the moving part 50 of the magnetic switch 20 of FIG. 3a, 3b.

In this embodiment, the moving part 50 of the magnetic switch 20 is designed to move between positions a first interface 62 and a second interface 64 of a cooling device 60 depending on a temperature T (and hence the magnetic state) of the magnetic switch 20. The magnetic switch 20 is arranged in an inhomogeneous magnetic field 18 generated by two pole shoes 14a, 16a and coupled to a spring 26, particularly a compression spring. Hence, the magnetic switch 20 has a first position, e.g. a spring-loaded position, Ps at the interface 62 and a second position, e.g. a magnetic field-loaded position, Pm at the other interface 64. For instance, the interface 62 is hotter than the interface 64. The spring 26 is a return means which provides a driving force acting on the moving part 50 of the magnetic switch 20 in one direction and the magnetic field provides a driving force in the opposite direction. It is to be understood that other return means for generating a driving force can be used instead of a spring 26 and that instead of a compression spring or additionally to a compression spring an extension spring can be arranged at the second interface 64.

A periodical heating and cooling of the moving part 50 of the magnetic switch 20 is created by moving the magnetic switch 20 when heated to its paramagnetic state to the cold side (interface 64) by force of the compression spring 26. When the magnetic switch 20 is cooled down below its Curie temperature Tc at the interface 64 the inhomogeneous magnetic field 18 pulls the now ferromagnetic switch 20 down towards the hot interface 62. The magnetic force of the inhomogeneous magnetic field 18 is much higher than the spring force. The magnetic switch 20 is heated on the interface 62 above its Curie temperature Tc where it becomes paramagnetic and is pushed by the spring 26 towards the cold interface 64 and so forth.

Figure 5:
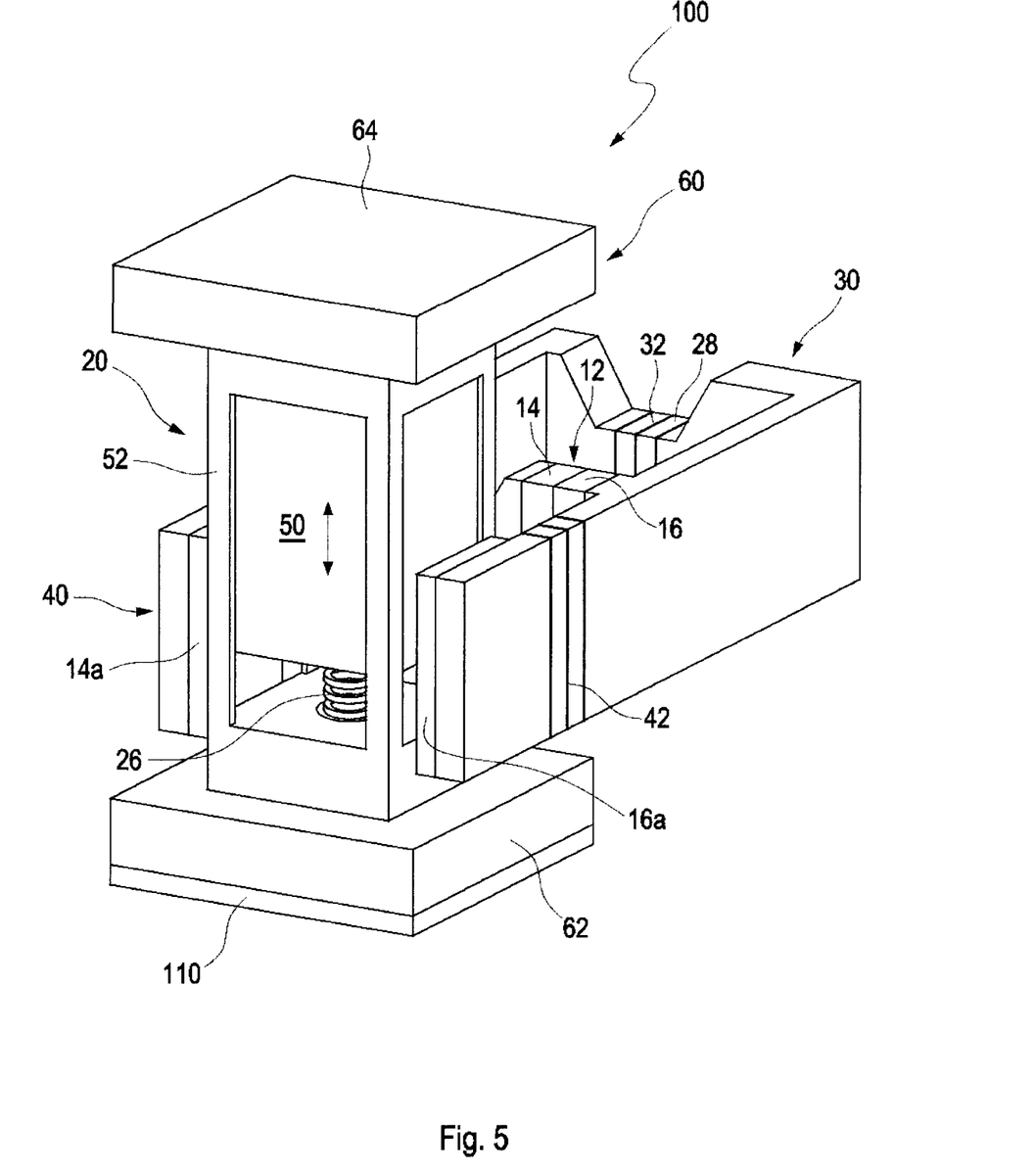

FIG. 4 displays the thermoelectric converter 10 comprising a magnetic switch 20 with a moving part 50 of the magnetic switch 20 arranged in a gap 34 (between pole shoes 14a, 16a) in a ferromagnetic bridge 40 for closing either a first magnetic circuit M1 or a second magnetic circuit M2. FIG. 5 illustrates a perspective view of an example embodiment of a thermoelectric converter 10 as shown schematically in FIG. 4.

The thermoelectric converter 10 comprises a magnet 12 with a first magnetic pole 14 (e.g. a north pole) and a second magnetic pole 16 (e.g. a south pole) arranged in a ferromagnetic leg 22.

The magnetic switch 20 is arranged in the second magnetic circuit M2. The magnet 12 is arranged in a ferromagnetic leg 22 which is arranged parallel to a first ferromagnetic bridge 30 and a second ferromagnetic bridge 40.

The first ferromagnetic bridge 30 and the ferromagnetic leg 22 constitute the first magnetic circuit M1. The first ferromagnetic bridge 30 comprises ferromagnetic legs 30a, 30b and 30c wherein ferromagnetic legs 30a and 30c are contacting the ferromagnetic leg 22. A constriction 28 is arranged in the ferromagnetic leg 30b. The magnetic switch 20 is permanently in contact with the ferromagnetic leg 30c and can switch contact between the second ferromagnetic bridge 40 and a contact 24 at the ferromagnetic leg 22. Contact 24 is shown in FIG. 1.

The second ferromagnetic bridge 40 and the ferromagnetic leg 22 constitute the first magnetic circuit M2. The second ferromagnetic bridge 40 comprises ferromagnetic legs 40a, 40b and 40c, wherein ferromagnetic legs 40a and 40c are connected to the ferromagnetic leg 22. The second ferromagnetic bridge 40 constitutes a short of the magnet 12 when the magnetic switch 20 closes the second magnetic circuit M2 and has a predominantly smaller cross section than the first ferromagnetic bridge 30 so that the magnetic resistance of the second ferromagnetic bridge 40 is higher than that of the first ferromagnetic bridge 30.

The magnetic switch 20 is made of a material which has a magnetic transition at a critical temperature, called Curie temperature Tc, i.e. it has a ferromagnetic state below the critical temperature Tc and a paramagnetic state above the critical temperature Tc, so that by heating or cooling the magnetic switch 20 the magnetic state of the magnetic switch 20 can be switched between paramagnetism and ferromagnetism. The magnetic susceptibility of the magnetic switch 20 differs by several orders of magnitude between the paramagnetic and ferromagnetic states, so that in the ferromagnetic state magnetic flux can enter the magnetic switch 20 and in the paramagnetic state magnetic flux cannot enter the magnetic switch 20. In the ferromagnetic state, the magnetic switch 20 magnetically shorts the ferromagnetic bridge 40 and guides magnetic flux into the coil 42 forming the second magnetic circuit M2 while in the paramagnetic state the magnetic resistance of the magnetic switch 20 is much higher so that the magnetic flux is in the first magnetic circuit M1.

The constriction 28 is arranged for adjusting the magnetic flux in the first ferromagnetic bridge 30 when the magnetic switch 20 is in its paramagnetic state. Because the constriction 28 in the first ferromagnetic bridge 30 is much smaller than the ferromagnetic legs 30a, 30b, 30c in the first ferromagnetic bridge 30, in the ferromagnetic state of the magnetic switch 20 hardly any magnetic flux enters the first ferromagnetic bridge 30. The constriction 28 reaches magnetic saturation at a distinctly lower magnetic flux density than the movable part 50 of the magnetic switch 20. Optionally, an air gap can be provided (not shown) having an effect corresponding to the air gap 34 in which the magnetic switch 20 is arranged.

The thermoelectric converter 10 can be part of a cooling system 100 of a microelectronic device 110 (indicated below the hot interface 62 which can be a heat sink) for removing waste heat generated in the microelectronic device 110.

This oscillatory movement of the moving part 50 of the magnetic switch 20 can be performed in a very small volume at high frequencies of several hundred Hertz up to several kilohertz without passive or active elements besides the spring 26. The high operating frequency can compensate the relatively small energy generation per switch cycle. A magnetic switch 20 of about 1 gram can create sufficient electric energy, for instance 20-35 W/g at 1 kHz operating frequency.

As can be seen in FIG. 5 the magnetic parts thermoelectric converter 10 are comparably small so that a sufficient integration of the thermoelectric converter 10 in microelectronic systems can be achieved. The moving part 50 of the magnetic switch 20 can be guided in a guiding rail 52 when moving between the interfaces 62, 64.

The operating frequency increases when the temperature difference between the hot and cold interfaces 62, 64 increases. The cooling efficiency increases accordingly. In other words, if the hot interface 62 is part of a cooling device 60 of a microelectronic chip connected to a surface of the chip, for instance, the cooling efficiency of the chip is increased if the chip becomes hotter and requires more cooling capacity. The thermoelectric converter 10 thus provides a stable, self-regulating cooling characteristic.

The invention claimed is:

1. A thermoelectric converter, comprising:
   at least a first magnetic circuit including magnetic flux;
   at least one electric coil coupled with the first magnetic circuit; and
   a magnetic switch, at least part of which is fixedly disposed within the first magnetic circuit, the magnetic switch operating to load the at least one electric coil with the magnetic flux of the first magnetic circuit depending on a temperature of the magnetic switch,
   wherein below a critical temperature, the magnetic switch is in a ferromagnetic state, and wherein above the critical temperature, the magnetic switch is in a paramagnetic states,
   wherein the magnetic switch is disposed between two pole shoes that produce a magnetic field, wherein the magnetic field produces a driving force on a moving part of the magnetic switch, and wherein the driving force is configured to move the moving part between a first interface and a second interface when the magnetic switch is in the ferromagnetic state,
   wherein the at least first magnetic circuit comprises at least one ferromagnetic bridge,
      the at least one ferromagnetic bridge comprises a first and a second ferromagnetic bridge,
      wherein the first and second ferromagnetic bridges each include a respective one or more ferromagnetic legs, and wherein the one or more ferromagnetic legs of the first ferromagnetic bridge are dimensioned to provide a higher magnetic resistance than the one or more ferromagnetic legs of the second ferromagnetic bridge,
   the magnetic switch is disposed inline with the one or more ferromagnetic legs of the first ferromagnetic bridge,
   wherein at last least one of the ferromagnetic legs of the second ferromagnetic bridge includes a constricted portion that is dimensioned such that magnetic flux in the second ferromagnetic bridge is substantially reduced when the magnetic switch is in a ferromagnetic state.

2. The converter according to claim 1, wherein the at least one electric coil is coupled with the at least one ferromagnetic bridge.

3. The converter according to claim 2, further comprising a second magnetic circuit, wherein the first and second magnetic circuits each include at least one respective ferromagnetic bridge, wherein each ferromagnetic bridge is coupled with a respective electric coil, and wherein the magnetic switch operates to alternately load each of the respective electric coils with the magnetic flux depending on the temperature of the magnetic switch.

4. The converter according to claim 1, wherein the magnetic switch is disposed inline with one of the at least one ferromagnetic bridge.

5. The converter according to claim 4, wherein the magnetic switch includes a moving part for moving between a first interface and a second interface depending on the temperature of the magnetic switch, and wherein the moving part is moved in a direction substantially perpendicular to a length of the one ferromagnetic bridge having the magnetic switch disposed inline.

6. The converter according to claim 1, wherein the moving part of the magnetic switch is coupled to a return means.

7. The converter according to claim 6, wherein the return means comprises one or more springs.

8. The converter according to claim 1, wherein the moving part of the magnetic switch moves to a first position at the first interface when the moving part is in a paramagnetic state and moves to a second position at the second interface when the moving part is in a ferromagnetic state.

9. The converter according to claim 1, wherein the magnetic switch is disposed in a gap in the at least one ferromagnetic bridge.

10. The converter according to claim 1, wherein the electric coil corresponding to the second ferromagnetic bridge is disposed around the constricted portion.

11. A cooling system, comprising:
   a thermoelectric converter for converting waste heat into electric energy that includes:
   at least a first magnetic circuit including magnetic flux;
   at least one electric coil coupled with the first magnetic circuit; and
   a magnetic switch, at least part of which is fixedly disposed within the first magnetic circuit, the magnetic switch operating to load the at least one electric coil with the magnetic flux of the first magnetic circuit depending on a temperature of the magnetic switch,
   wherein below a critical temperature, the magnetic switch is in a ferromagnetic state, and wherein above the critical temperature, the magnetic switch is in a paramagnetic state,
   wherein the magnetic switch is disposed between two pole shoes that produce a magnetic field, wherein the magnetic field produces a driving force on a moving part of the magnetic switch, and wherein the driving force is configured to move the moving part between a first interface and a second interface when the magnetic switch is in the ferromagnetic state,
   wherein the at least first magnetic circuit comprises at least one ferromagnetic bridge,
      the at least one ferromagnetic bridge comprises a first and a second ferromagnetic bridge,
      wherein the first and second ferromagnetic bridges each include a respective one or more ferromagnetic legs, and wherein the one or more ferromagnetic legs of the first ferromagnetic bridge are dimensioned to provide a higher magnetic resistance than the one or more ferromagnetic legs of the second ferromagnetic bridge,
   the magnetic switch is disposed inline with the one or more ferromagnetic legs of the first ferromagnetic bridge, wherein at last least one of the ferromagnetic legs of the second ferromagnetic bridge includes a constricted portion that is dimensioned such that magnetic flux in the second ferromagnetic bridge is substantially reduced when the magnetic switch is in a ferromagnetic state.

12. The system according to claim 11, wherein the magnetic switch operates to couple at least temporarily to a cooling device for transporting the waste heat.

13. The system according to claim 12, further comprising a microelectronic device coupled with the thermoelectric converter.

14. The system according to claim 12, wherein the cooling device is a water-cooled heat sink.

* * * * *